(12) United States Patent
Choi

(10) Patent No.: US 12,487,941 B1
(45) Date of Patent: Dec. 2, 2025

(54) MEMORY DEVICE AND METHOD FOR DYNAMICALLY MAPPING ADDRESS THEREOF

(71) Applicant: REBELLIONS INC., Seongnam-si (KR)

(72) Inventor: Sungpill Choi, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/083,354

(22) Filed: Mar. 18, 2025

(30) Foreign Application Priority Data

May 31, 2024 (KR) .......................... 10-2024-0071687

(51) Int. Cl.
*G06F 12/10* (2016.01)

(52) U.S. Cl.
CPC .................................... *G06F 12/10* (2013.01)

(58) Field of Classification Search
CPC ... G06F 12/1081; G06F 12/0246; G06F 12/10
USPC .................................................. 711/162, 202
See application file for complete search history.

(56) References Cited

U.S. PATENT DOCUMENTS

| | | | |
|---|---|---|---|
| 8,612,711 B1* | 12/2013 | Griffin | ................ G06F 12/0806 710/3 |
| 2010/0169673 A1* | 7/2010 | Saripalli | ............ G06F 12/1081 713/300 |
| 2017/0255459 A1* | 9/2017 | Tanimoto | .................. G06F 8/65 |
| 2022/0405013 A1 | 12/2022 | Xotta et al. | |
| 2023/0124004 A1 | 4/2023 | Jiang et al. | |
| 2023/0298128 A1 | 9/2023 | Puffer et al. | |

FOREIGN PATENT DOCUMENTS

| | | |
|---|---|---|
| KR | 10-0745163 B1 | 8/2007 |
| KR | 10-2008-0026393 A | 3/2008 |
| KR | 10-2020-0139913 A | 12/2020 |
| KR | 10-2022-0058944 A | 5/2022 |

* cited by examiner

*Primary Examiner* — Gautam Sain
*Assistant Examiner* — Edward Waddy, Jr.
(74) *Attorney, Agent, or Firm* — BROADVIEW IP LAW, PC

(57) ABSTRACT

Provided are a memory device and a method for dynamically mapping address thereof, in which the memory device includes a memory including a plurality of memory regions, an address register in which at least one of a memory device different from the memory device or a host stores a device address for accessing the memory, and an address translator configured to receive a first interrupt, and in response to the first interrupt, convert a physical address of the memory mapped to the device address.

20 Claims, 12 Drawing Sheets

| | TRANSMITTING-SIDE MEMORY ADDRESS | RECEPTION SIDE MEMORY ADDRESS | SIZE OF DATA TO BE TRANSMITTED | INTERRUPT |
|---|---|---|---|---|
| 1 | MEMORY ADDRESS | FIRST DEVICE ADDRESS | FIRST DATA SIZE | REMOTE INTERRUPT |
| 2 | MEMORY ADDRESS + FIRST DATA SIZE | FIRST DEVICE ADDRESS | SECOND DATA SIZE | REMOTE INTERRUPT |
| 3 | MEMORY ADDRESS + SECOND DATA SIZE | FIRST DEVICE ADDRESS | THIRD DATA SIZE | REMOTE INTERRUPT |
| ⋮ | ⋮ | ⋮ | ⋮ | ⋮ |
| n | MEMORY ADDRESS + N-1-TH DATA SIZE | FIRST DEVICE ADDRESS | N-TH DATA SIZE | LOCAL INTERRUPT |

FIG. 8

MEMORY DEVICE AND METHOD FOR DYNAMICALLY MAPPING ADDRESS THEREOF

CROSS-REFERENCE TO RELATED APPLICATION

This application claims priority to Korean Patent Application No. 10-2024-0071687, filed in the Korean Intellectual Property Office on May 31, 2024, the entire contents of which are hereby incorporated by reference.

BACKGROUND

Field

The present disclosure relates to a memory device and a method for dynamically mapping address thereof, and more specifically, to a memory device that converts a physical address of a memory mapped to a device address in response to a received interrupt, and a method for dynamically mapping address thereof.

Description of Related Art

Communication and connection of memory devices may be an important factor for expanding the performance of a system including a plurality of memory devices. In particular, peer-to-peer (P2P) methods that reduce overhead by implementing direct memory access (DMA) to provide direct connection between memory devices without host intervention may play a major role in improving the performance of the system by increasing the efficiency and speed of data transmission.

Memory mapped input/output (MMIO) may be used for the host to access the memory of the memory device or for the memory device to access the memory of another memory device. That is, the host or the memory device may map the address of the memory to be accessed to its address space, and may access the memory based on the mapped address.

However, according to related MMIO-based technologies, MMIO is used with all memory spaces open to the outside, and accordingly, the range of addresses to be mapped increases as the number of memory devices to be accessed or the size of memory to be accessed increases, and this leads into problems of large resource consumption and security vulnerabilities.

SUMMARY

In order to solve one or more problems (e.g., the problems described above and/or other problems not explicitly described herein), the present disclosure provides a memory device and a method for dynamically mapping address thereof.

The present disclosure may be implemented in a variety of ways, including methods, devices (systems) and/or computer programs stored in computer readable storage media.

According to one aspect, a memory device is provided, which may include a memory including a plurality of memory regions, an address register in which at least one of a memory device different from the memory device or a host stores a device address for accessing the memory, and an address translator configured to receive a first interrupt, and in response to the first interrupt, convert a physical address of memory mapped to device address.

The address translator may be configured to receive the first interrupt from at least one of the memory device different from the memory device or the host, and the memory may be configured to, before receiving the first interrupt, receive a first traffic accessing a first memory region of the memory based on the device address, and after receiving the first interrupt, receive a second traffic accessing a second memory region of the memory based on the device address.

The address translator may be configured to receive the first interrupt based on an interrupt control address stored in the address register, and the device address and the interrupt control address may be different from each other.

A range of device addresses may be smaller than a range of physical addresses of the memory.

The memory device may further include at least one local processor configured to control the address translator.

The at least one local processor may be configured to receive an access start signal for the memory from at least one of the memory device different from the memory device or the host, in response to the access start signal, set conversion information of the address translator.

The at least one local processor may be configured to, after setting the conversion information, generate an access ready signal for the memory, and transmit the generated access ready signal to at least one of the memory device different from the memory device or the host, and in response to the access ready signal, at least one of the memory device different from the memory device or the host may transmit a traffic.

The at least one local processor may be configured to receive an access end signal for the memory from at least one of the memory device different from the memory device or the host, and deactivate the address translator in response to the access end signal.

The access end signal may be transmitted in response to at least one second interrupt from the memory device different from the memory device or the host, and the second interrupt may be generated after at least one of the memory device different from the memory device or the host transmits all the traffics.

The memory device may include a peripheral component interconnect express (PCIe) device that communicates based on a PCI-express interface.

If the physical address of the memory mapped to the device address is a last physical address, the address translator may maintain the physical address of the memory mapped to the device address.

The memory device may include an interrupt controller configured to generate the first interrupt and transmit the first interrupt to the address translator, and the interrupt controller may be configured to generate the first interrupt in response to the memory receiving a traffic from at least one of the memory device different from the memory device or the host.

A method for dynamically mapping address is provided, which may be performed by a memory device including a memory and which may include receiving a first traffic accessing a first memory region of the memory based on a device address, receiving a first interrupt, in response to the first interrupt, converting a physical address of the memory mapped to the device address, and receiving a second traffic accessing a second memory region of the memory based on the device address.

The receiving the first interrupt may include receiving the first interrupt based on an interrupt control address different from the device address, and the device address and the interrupt control address may be stored in the address register of the memory device.

The first traffic, the second traffic, and the first interrupt may be received from at least one of the memory device different from the memory device or the host.

The method may include, before receiving the first traffic, receive an access start signal for the memory from at least one of the memory device different from the memory device or the host, in response to the access start signal, setting conversion information of the memory device, generating an access ready signal for the memory, and transmitting the generated access ready signal to at least one of the memory device different from the memory device or the host.

The method may further include, after receiving the second traffic, receiving an access end signal for the memory from at least one of the memory device different from the memory device or the host, and in response to the access end signal, deactivating the conversion of the physical address of the memory, in which the access end signal may be transmitted in response to at least one second interrupt from the memory device different from the memory device or the host, and the second interrupt may be generated after at least one of the memory device different from the memory device or the host transmits all the traffics.

The converting the physical address of the memory mapped to the device address in response to the first interrupt may include maintaining the physical address of the memory mapped to the device address, if the physical address of the memory mapped to the device address is a last physical address.

The receiving the first interrupt may include receiving the first interrupt from an interrupt controller of the memory device, and the interrupt controller may be configured to generate the first interrupt in response to the memory receiving a traffic from at least one of the memory device different from the memory device or the host.

A computer program is provided, which is stored on a computer-readable recording medium for executing the method described above according to some aspects on a computer.

According to various aspects of the present disclosure, the memory device may include the address translator that converts the physical address of the memory mapped to the device address, and may perform dynamic address mapping through the address translator to allow the traffics received based on the same device address to access different memory regions. Accordingly, the size of the address register of the memory device storing the device address can be minimized and the excessive resource consumption issues and/or the security problems may be prevented.

According to various aspects, the device address associated with the traffic and the interrupt control address associated with the interrupt can be different from each other, and the address register of the memory device can store the device address and the interrupt control address in different regions in the address register. As a result, the traffic and the interrupt can be simultaneously received without delay issues, and efficient address conversion can be performed without stopping operations to process the interrupt.

According to various aspects, the memory device may include the local processor that controls the address translator, and may set or deactivate conversion information of the address translator through the local processor. As a result, the memory device may control the address translator to efficiently perform dynamic address mapping through the local processor.

According to various aspects, if the physical address of the memory mapped to the device address is the last physical address, the address translator of the memory device can maintain the physical address of the mapped memory without converting the same, or can convert it into one of the previously mapped physical addresses of the memory. As a result, the problem of a non-existent physical address being mapped to the device address can be prevented.

According to various aspects, the memory device may include the interrupt generator that generates an interrupt associated with the address conversion, and the memory device may perform dynamic address mapping based on the interrupt generated by the interrupt generator. As a result, latency that may occur when receiving an interrupt associated with the address conversion from at least one of the memory device different from the memory device or the host can be prevented.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

Aspects of the present disclosure will be described with reference to the accompanying drawings described below, where similar reference numerals indicate similar elements, although the present disclosure is not limited thereto, in which:

FIG. 8 is a diagram illustrating an example of a table listing data transmitted between memory devices according to one aspect;

DETAILED DESCRIPTION

Figure 1:
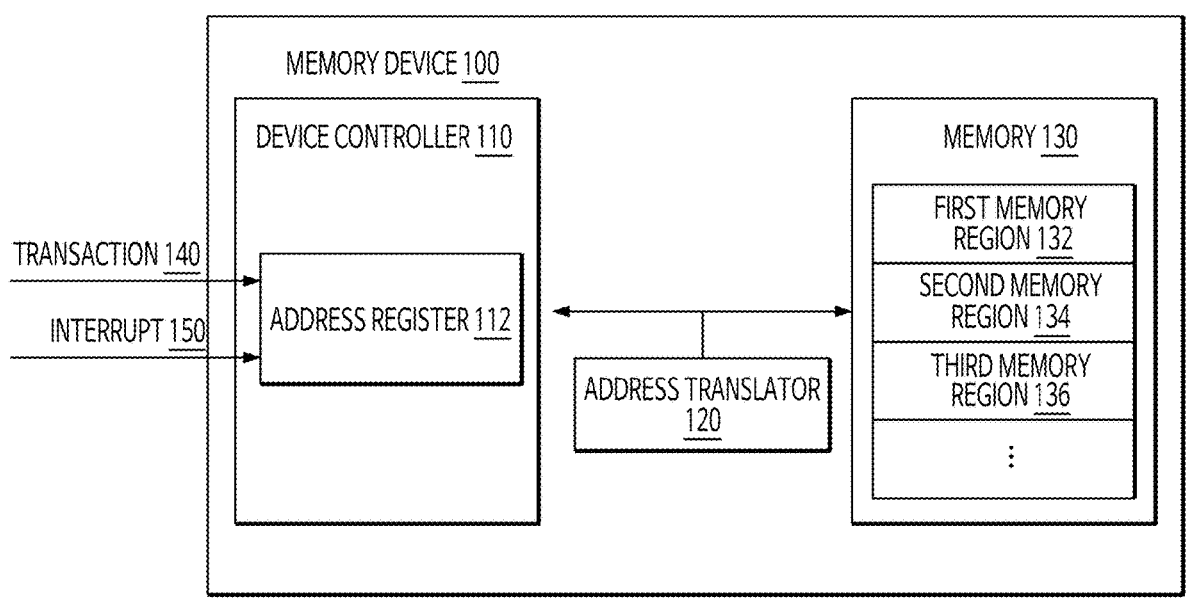
FIG. 1 is a diagram provided to explain a configuration of a memory device according to one aspect.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same reference numerals are assigned to the same or corresponding components. In addition, in the description of the following aspects, overlapping descriptions of the same or corresponding components may be omitted. However, even if the description of the component is omitted, it is not intended that such a component is not included in any aspect.

Advantages and features of the disclosed embodiments, and methods of accomplishing the same, will be apparent by referring to the embodiments described below in connection with the accompanying drawings. However, the present disclosure is not limited to the embodiments disclosed below and may be implemented in various different forms. These embodiments are merely provided to make the present disclosure complete and to fully inform those skilled in the art of the scope of the disclosure.

The terms used herein will be briefly described prior to describing the disclosed embodiments in detail. The terms used herein have been selected as general terms that are widely used at present in consideration of the functions of the present disclosure, but this may vary according to the intent of a person skilled in the art, related precedents, or the emergence of new technology. In addition, in specific cases, certain terms may be arbitrarily selected by the applicant, and the meaning of such terms will be described in detail in the relevant part of the description of the invention. Therefore, the terms used in the present disclosure should be defined based on the meaning they convey and the overall content of the present disclosure rather than merely by their names.

The singular forms "a," "an," and "the" as used herein are intended to include the plural forms as well, unless the context clearly requires the singular form. Further, the plural forms are intended to include the singular forms as well, unless the context clearly requires the plural form. Throughout the description, when a portion is stated as "comprising (including)" an element, unless explicitly stated otherwise, it means that the portion may additionally include another element, rather than excluding other elements.

In addition, the term "module" or "unit" used in the specification refers to a software or hardware component, and a "module" or "unit" performs certain roles. However, the meaning of a "module" or "unit" is not limited to software or hardware. A "module" or "unit" may be configured to reside in an addressable storage medium or be configured to control one or more processors. Thus, as an example, a "module" or "unit" may include components such as software components, object-oriented software components, class components, and task components, and at least one of processes, functions, attributes, procedures, subroutines, segments of program code, drivers, firmware, microcode, circuits, data, databases, data structures, tables, arrays, or variables. Components and "modules" or "units" may be combined into a smaller number of components and "modules" or "units" or further separated into additional components and "modules" or "units".

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, etc. Under some environments, the "processor" may refer to an application-specific integrated circuit (ASIC), a programmable logic device (PLD), a field-programmable gate array (FPGA), etc. The "processor" may refer to a combination of processing devices, e.g., a combination of a DSP and a microprocessor, a combination of a plurality of microprocessors, a combination of one or more microprocessors combined with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), and (b) used in the following embodiments are only used to distinguish certain components from other components, and these terms do not limit the nature, sequence, or order of the corresponding components.

In addition, in the following embodiments, if one component is described to be "connected," "coupled," or "attached" to another component, it should be understood that the component may be directly connected or coupled to the other component, but another component may also be "connected," "coupled," or "attached" in between them.

In addition, the words "comprises" and/or "comprising" as used in the following embodiments mean that the components, steps, operations, and/or elements mentioned do not exclude the presence or addition of one or more other components, steps, operations, and/or elements.

In addition, in the following embodiments, "each of a plurality of A's" may refer to each of all components included in the plurality of A's, or it may refer to each of some components included in the plurality of A's.

In the present disclosure, a "device address" may refer to an address used by a memory device or host in a computer system to access a memory of a specific memory device. The "device address" may be mapped to a physical address of the memory of the specific memory device, and the memory device or host in the computer system may access a memory region corresponding to the mapped physical address of the memory through the "device address".

Figure 2:
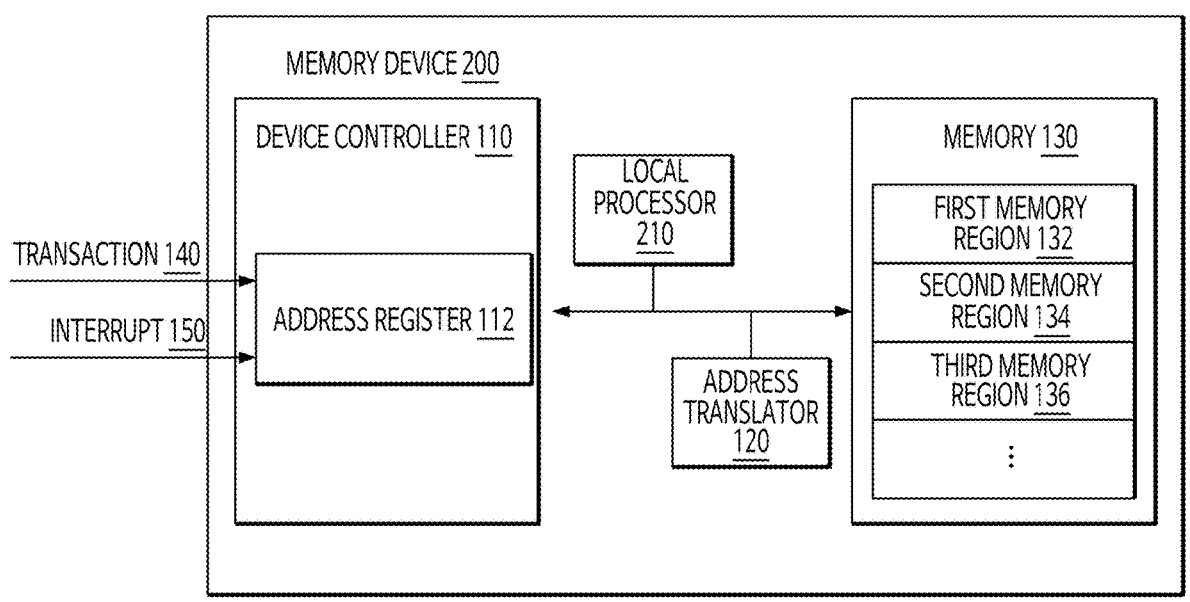
FIG. 2 is a diagram provided to explain a configuration of a memory device according to another aspect.
Figure 3:
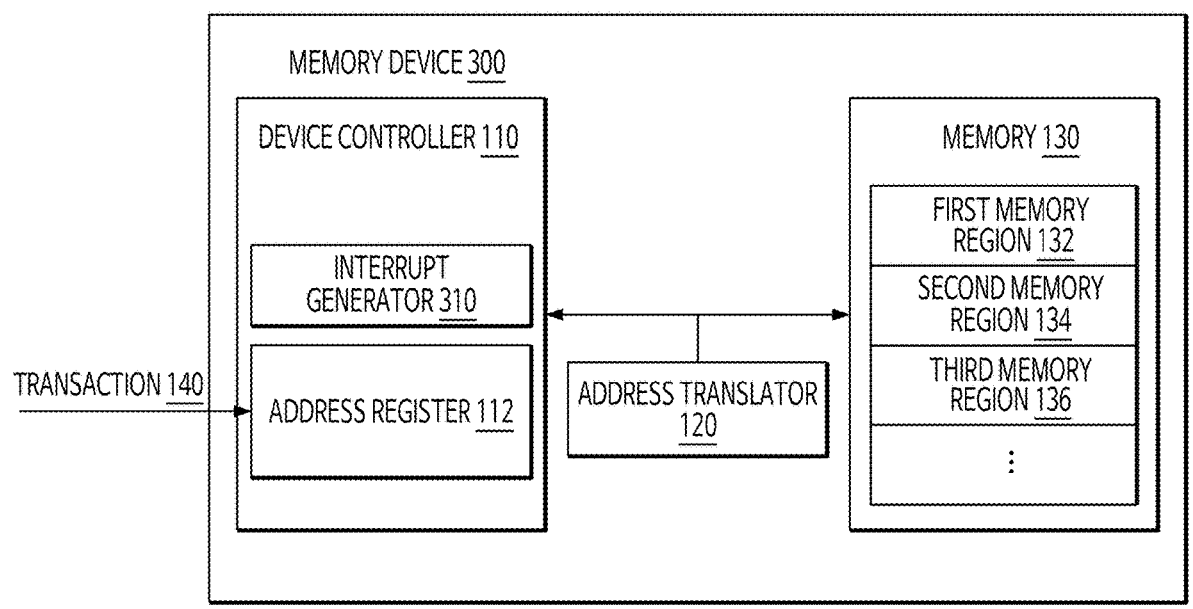
FIG. 3 is a diagram provided to explain a configuration of a memory device according to yet another aspect.

FIG. 1 is a diagram provided to explain a configuration of a memory device 100 according to one aspect. FIG. 2 is a diagram provided to explain a configuration of a memory device 200 according to another aspect of the present disclosure. FIG. 3 is a diagram provided to explain a configuration of a memory device 300 according to yet another aspect of the present disclosure. The memory devices 100, 200, and 300 of FIGS. 1 to 3 may be devices (e.g., peripheral component interconnect express (PCIe) devices, etc.) that write or read data to or from at least one of a memory device different from the memory device 100 or a host through a bus interface (e.g., PCI-express, etc.). The memory devices 100, 200, and 300 of FIGS. 1 to 3 may commonly include a device controller 110, an address translator 120, and a memory 130. Hereinafter, the common configurations of the memory devices 100, 200, and 300 of FIGS. 1 to 3 will be described first.

The device controller 110 may serve to control functions of at least some components of the memory devices 100, 200, and 300. For example, the device controller 110 may perform control and optimization of accesses to the memory devices 100, 200, and 300, management of addresses and data buses, error detection and correction in the memory devices 100, 200, and 300, etc. To this end, the device controller 110 may include an address register 112.

The address register 112 may store and/or manage a device address for accessing the memory 130 of the memory device 100. At least one of a memory device different from the memory devices 100, 200, and 300 or a host may access the memory 130 of the memory devices 100, 200, and 300 using the device address stored in the address register 112. In addition, the memory region of the memory 130 accessible by at least one of a memory device different from the memory devices 100, 200, and 300 or a host may be determined by the size of the address register 112. The memory devices 100, 200, and 300 may receive a transaction 140 and/or an interrupt 150 through the device address and/or the interrupt control address stored in the address register 112.

The address register 112 may be a base address register (BAR), and the address register 112 may store a base address and an offset. The base address may be a start address of a memory region of the memory 130 of the memory devices 100, 200, and 300 that may be accessed by at least one of the memory device different from the memory devices 100, 200, and 300 or the host. In addition, the address register 112 may be implemented in the form of a stack pointer, an index address register, etc.

In FIG. 1, for convenience of description, it is illustrated that the device controller 110 includes a single address register 112, but the present disclosure is not limited thereto, and the device controller 110 may include a plurality of address registers 112.

The memory 130 may store data transmitted from at least one of the memory device different from the memory devices 100, 200, and 300 or the host, or transmit the stored data to at least one of the memory device different from the memory devices 100, 200, and 300 or the host. The memory 130 may include a plurality of memory regions 132, 134, and 136.

The address translator 120 may convert the physical address of the memory 130 mapped to the device address. The device address may be a device address stored in the address register 112. The device address may be mapped to the physical address of the first memory region 132 of the memory 130, and the address translator 120 may receive an interrupt from at least one of a memory device different from the memory device or the host 100, and in response to the received interrupt, convert the physical address of the first memory region 132 mapped to the device address into the physical address of the second memory region 134.

In FIG. 2, the memory device 200 may further include a local processor 210. The local processor 210 may serve to control the address translator 120 directly or indirectly. In one embodiment, the local processor 210 may receive an access start signal for the memory 130 from at least one of a memory device different from the memory device 200 of FIG. 2 or a host, and in response to the access start signal, cause the device controller 110 to set conversion information of the address translator 120. Additionally or alternatively, in response to the access start signal, the local processor 210 may directly set the conversion information of the address translator 120. In addition, in one embodiment, the conversion information may include the physical address of the memory 130 currently mapped to the device address, the physical address of the memory 130 scheduled to be mapped to the device address, and the like. After setting the conversion information, the local processor 210 may generate an access ready signal for the memory 130 and transmit the generated access ready signal to at least one of a memory device different from the memory device 200 of FIG. 2 or a host. At least one of the memory devices or hosts receiving the access ready signal may transmit traffic to the memory device 200 of FIG. 2 in response to the access ready signal.

In FIG. 3, the memory 130 may further include an interrupt generator 310. In response to the memory 130 receiving traffic from at least one of a memory device different from the memory device 300 of FIG. 3 or a host, the interrupt generator 310 may generate an interrupt. The interrupt generator 310 may transmit the generated interrupt to the address translator 120. The address translator 120 may receive the interrupt generated by the interrupt generator 310, and in response to the received interrupt, convert the physical address of the first memory region 132 mapped to the device address into the physical address of the second memory region 134.

As described above, through the address translator 120, the memory devices 100, 200, and 300 may perform dynamic address mapping that controls so that data or traffic received based on the same device address access different memory regions. As a result, by minimizing the size of the address register 112 storing the device address, the excessive resource consumption problem and/or security problem may be prevented. This will be described in more detail below with reference to FIGS. 5 and 6.

In FIGS. 1 to 3, the components of each of the memory devices 100, 200, and 300 represent functionally classified functional units, and the plurality of components may be implemented in an integrated form in the actual physical environment. Alternatively, the components of each of the memory devices 100, 200, and 300 may be implemented separately from each other in the actual physical environment. In addition, the internal configuration of the memory device 100 is not limited to FIG. 1, and some components may be omitted or other components may be added.

In addition, it is illustrated that the memory device 200 of FIG. 2 and the memory device 300 of FIG. 3 include the local processor 210 and the interrupt generator 310, respectively, but the present disclosure is not limited thereto, and the memory device may be configured to include not only the device controller 110, the address translator 120, and the memory 130, but also the local processor 210 and the interrupt generator 310.

Figure 4:
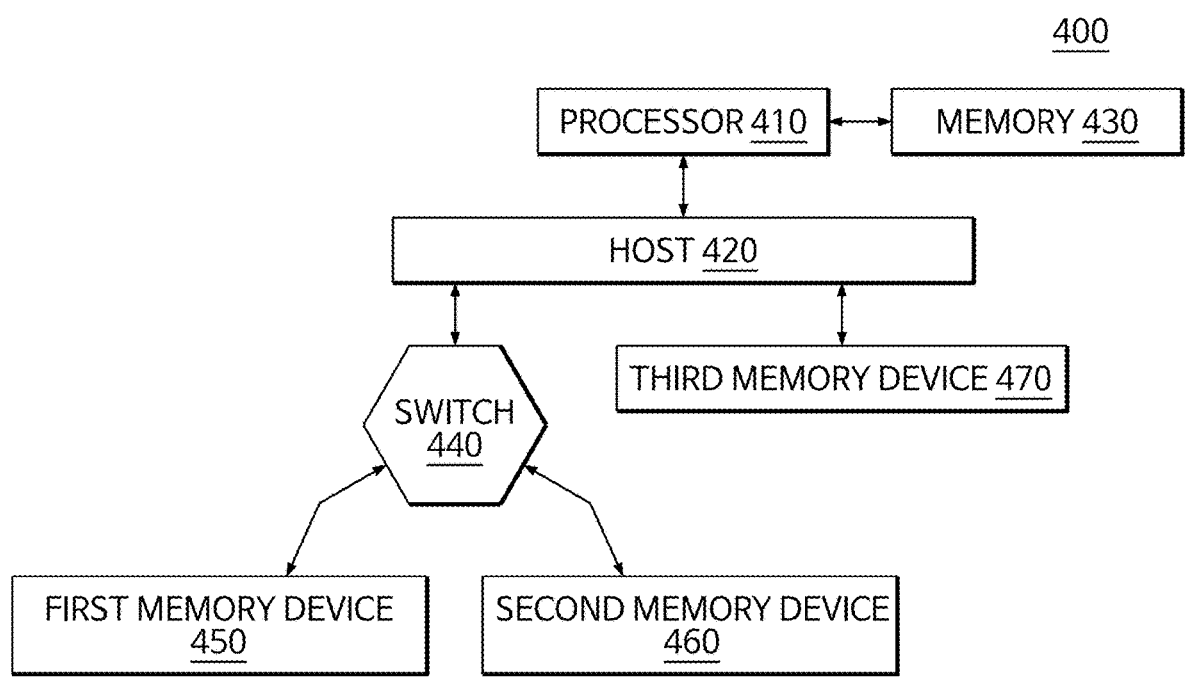
FIG. 4 is a diagram provided to explain a configuration of a computer system according to one aspect.

FIG. 4 is a diagram provided to explain a configuration of a computer system 400. The computer system 400 may be a system in which hardware (e.g., CPU, memory, input/output device, etc.) and software (e.g., operating system, application program, etc.) interact with each other to process and provide information. The computer system 400 may include a host 420, a processor 410, a root complex (e.g., located within the host 420), a memory 430, a switch 440, and memory devices 450, 460, and 470, and the host 420 may include the processor 410, the root complex, and/or the memory 430. Each of the components included in the computer system 400 may communicate with each other via any communication interface including a bus interface (e.g., PCI-express, etc.). Each of the memory devices 450, 460, and 470 may be any one of the memory devices 100, 200, and 300 described above.

The processor 410 may be a central processing unit of the computer system 400 and may serve to control the computer system 400. The processor 410 may transmit a traffic to the memory devices 450, 460, and 470 through the host 420 to control the operation of the memory devices 450, 460, and 470.

The host 420 may serve to connect the processor 410 and the memory 430 to one or more of the memory devices 450, 460, and 470. The host 420 may include a host bridge and/or one or more root bridges.

The memory 430 may be a system memory that stores instructions and/or data necessary for the control of the computer system 400 of the processor 410. The memory 430 may be SRAM, DRAM, or SDRAM, but is not limited thereto, and may be various types of memories.

The switch 440 may serve to manage and control connections of the memory devices 450 and 460. For example, the switch 440 may manage a data transmission path so that the first memory device 450 and the second memory device 460 may simultaneously transmit and receive data.

The memory devices 450, 460, and 470 may be peripheral devices that transmit and receive data to and from the processor 410 or the host 420. For example, the memory devices 450, 460, and 470 may include a solid state drive (SSD), a graphics processing unit (GPU), or a hard disk drive (HDD), but are not limited thereto, and may be various types of devices that include at least one memory.

The memory devices 450, 460, and 470 may be directly or indirectly connected to the host 420. For example, the first memory device 450 and the second memory device 460 may be indirectly connected to the host 420 through the switch 440. On the other hand, the third memory device 470 may be directly connected to the host 420.

Figure 5:
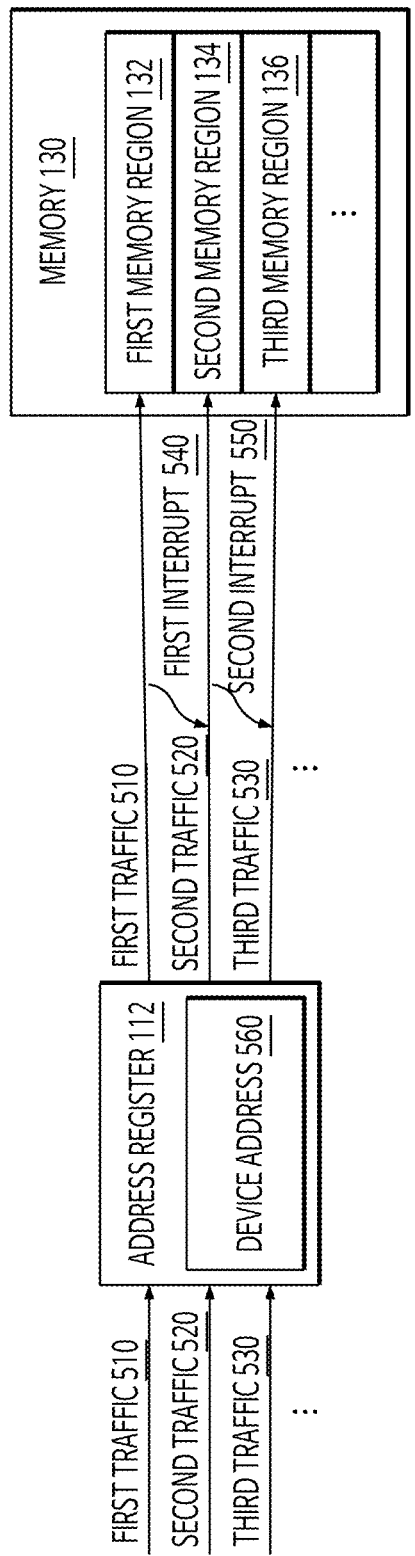
FIG. 5 is a diagram illustrating an example in which traffics access memory regions of a memory according to one aspect.

FIG. 5 is a diagram illustrating an example in which traffics 510, 520, and 530 access the memory regions 132, 134, and 136 of the memory 130. Each of the traffics 510, 520, and 530 may access different memory regions 132, 134, and 136 of the memory 130, respectively, based on a device address 560 stored in the address register 112. In addition, during the process where each of the traffics 510, 520, and 530 accesses the memory regions 132, 134, and 136, dynamic address mapping may also be performed, in which the physical address of the memory 130 mapped to the device address 560 is converted. The traffics 510, 520, and 530 may be transmitted from at least one of the memory device or the host of the computer system.

The physical address of the memory 130 mapped to the device address 560 may be a first physical address that designates the first memory region 132, and the first traffic 510 may access the first memory region 132 through the device address 560. A first interrupt 540 may be received after the first traffic 510 accesses the first memory region 132, and in response to the first interrupt 540, the physical address of the memory 130 mapped to the device address 560 may be converted into a second physical address that designates the second memory region 134.

The second traffic 520 may access the second memory region 134 through the device address 560. A second interrupt 550 may be received after the second traffic 520 accesses the second memory region 134, and in response to the second interrupt 550, the physical address of the memory 130 mapped to the device address 560 may be converted into a third physical address that designates the third memory region 136. The third traffic 530 may access the third memory region 136 through the device address 560.

As described above, by converting the physical address of the memory 130 mapped to the device address 560, the traffics 510, 520, and 530 may access different memory regions 132, 134, and 136 through the same device address 560, respectively. As a result, the range of device addresses 560 required for each of the traffics 510, 520, and 530 to access different memory regions 132, 134, and 136 may be smaller than the range of physical addresses of the memory 130, and the size of the address register 112 required to store the device address 560 may be reduced.

In FIG. 5, only the process in which the first to third traffics 510, 520, and 530 access the first to third memory regions 132, 134, and 136 is illustrated, but the present disclosure is not limited thereto, and two or less traffics or four or more traffics may access the memory regions of the memory 130. If four or more traffics access the memory 130, the dynamic address mapping process described above may be repeatedly performed.

Figure 6:
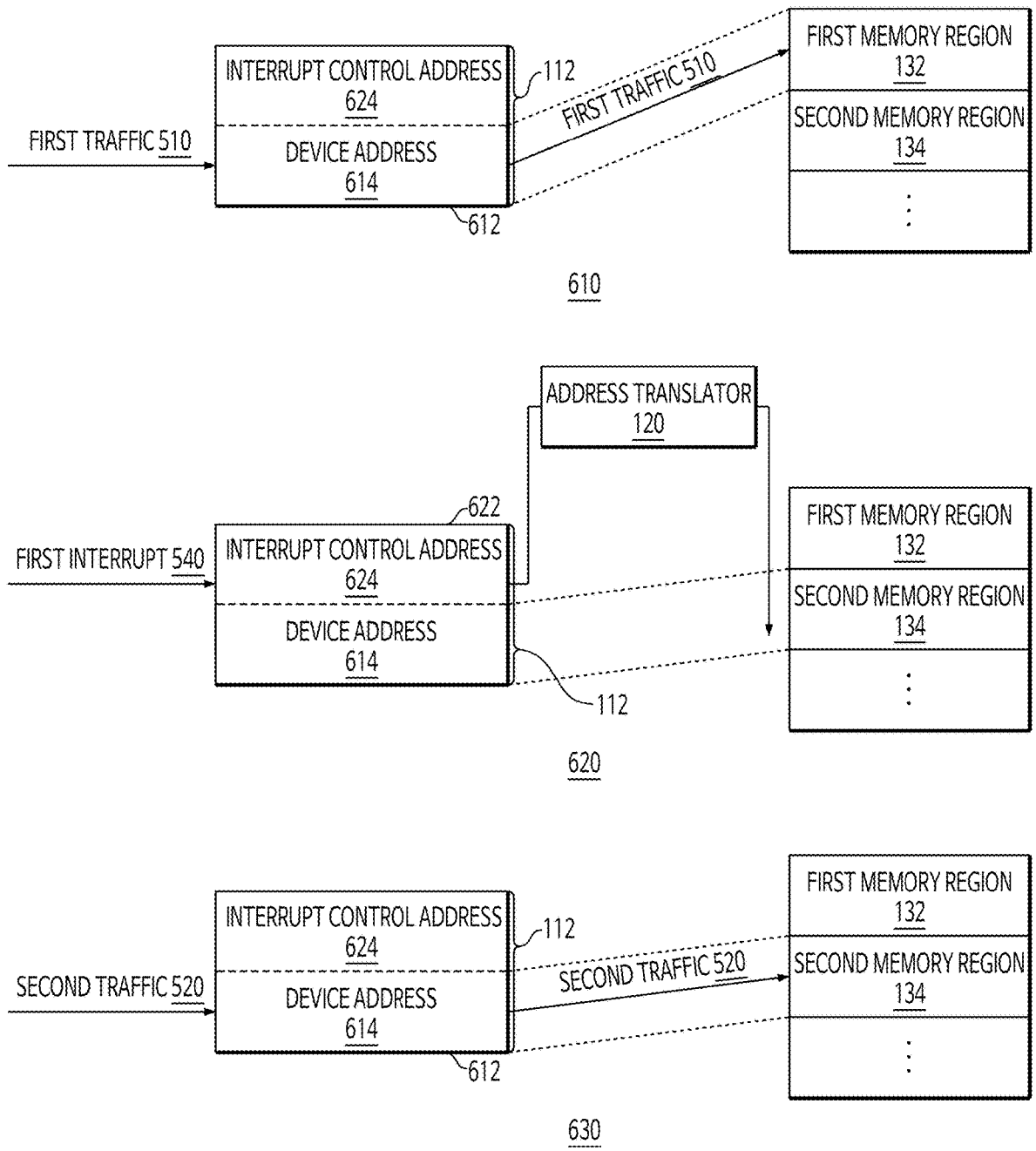
FIG. 6 is a diagram illustrating an example in which a first traffic accesses a first memory region and a second traffic accesses a second memory region according to one aspect.

FIG. 6 is a diagram illustrating an example in which the first traffic 510 accesses the first memory region 132 and the second traffic 520 accesses the second memory region 134. The first traffic 510 and the second traffic 520 may access the first memory region 132 and the second memory region 134 through first to third operations 610, 620, and 630, respectively.

The first operation 610 may represent an example in which the first traffic 510 accesses the first memory region 132. The first traffic 510 may access the first memory region 132 based on a device address 614 stored in a first region 612 of the address register 112. In this case, the first traffic 510 may be received from at least one of another memory device or the host. In addition, a first physical address designating the first memory region 132 may be mapped to the device address 614. The device address 614 may include a base address and an offset.

The second operation 620 may represent an example in which the address translator 120 performs dynamic address conversion. The first interrupt 540 may be transmitted to the address translator 120 based on an interrupt control address 624 stored in a second region 622 of the address register 112. In response to the first interrupt 540, the address translator 120 may perform dynamic address conversion. That is, in response to the first interrupt 540, the address translator 120 may convert the physical address mapped to the device address 614 into a second physical address that designates the second memory region 134. The first interrupt 540 may be received from at least one of another memory device or the host. Additionally or alternatively, the first interrupt 540 may be received from the interrupt generator. In addition, the device address 614 and the interrupt control address 624 may be different from each other.

The third operation 630 may represent an example in which the second traffic 520 accesses the second memory region 134. The second traffic 520 may access the second memory region 134 based on the device address 614 stored in the first region 612 of the address register 112. In this case, the second traffic 520 may be received from at least one of another memory device or the host. In addition, according to the second operation 620, the second physical address designating the second memory region 134 may be mapped to the device address 614.

FIG. 6 illustrates that the first region 612 and the second region 622 of the address register 112 are physically divided, but the present disclosure is not limited thereto. For example, the first region 612 and the second region 622 may be integrally implemented in the physical environment, but logically divided to store the device address 614 and the interrupt control address 624, respectively.

In addition, FIG. 6 shows only the first memory region 132 and the second memory region 134, but the present disclosure is not limited thereto, and there may be different numbers of memory regions. Likewise, it is illustrated that only the first traffic 510 and the second traffic 520 access the memory regions 132 and 134, but aspects are not limited thereto, and a different number of traffic flows may access the memory regions.

Through the first to third operations 610, 620, and 630 described above, the size of the address register of the memory device storing the device address may be minimized, thereby preventing excessive resource consumption issues and security problems. In addition, the device address 614 associated with the first and second traffics 510 and 520 and the interrupt control address 624 associated with the first interrupt 540 may be different from each other, and the address register 112 of the memory device may store the device address 614 and the interrupt control address 624 in different regions in the address register. As a result, the traffic and the interrupt may be simultaneously received without delay issues, and efficient address conversion may be performed without stopping operations to process the interrupt.

Figure 7:
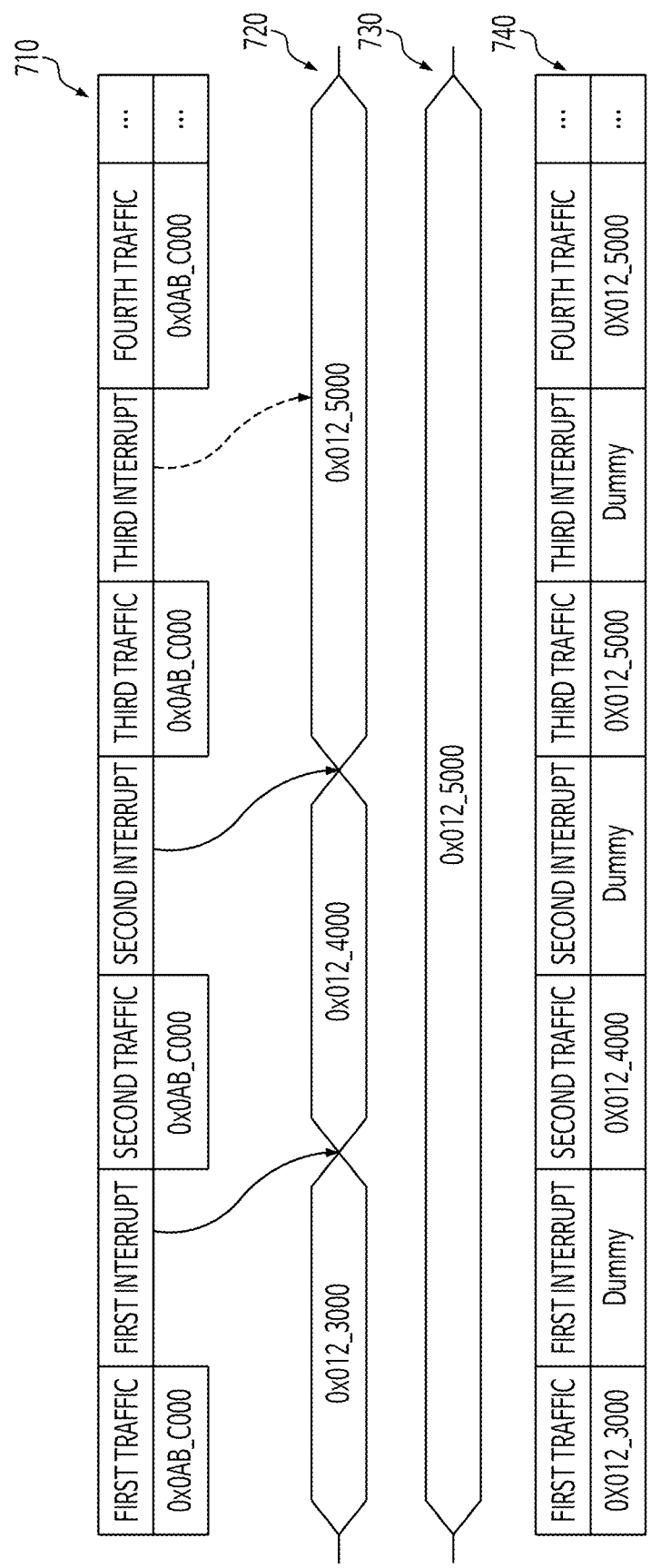
FIG. 7 is a timing diagram provided to explain a process of dynamically mapping address according to one aspect.

FIG. 7 is a timing diagram provided to explain a process of dynamically mapping address according to one aspect. A first timing diagram 710 is a diagram illustrating a process in which traffics and interrupts are transmitted to the memory devices (e.g., the memory device 100 of FIG. 1, the memory device 200 of FIG. 2, and the memory device 300 of FIG. 3) in chronological order. A second timing diagram 720 is a diagram illustrating the physical addresses of the memory mapped to the device addresses in chronological order. A third timing diagram 730 is a diagram illustrating the last physical address of the memory. A fourth timing diagram 740 is a diagram illustrating a process in which the traffics and interrupts received by the memory device access the memory in chronological order.

The first traffic may access the memory of the memory device based on a device address 0x0AB_C000. In this case, the device address 0x0AB_C000 is mapped to a first physical address 0x012_3000 that designates the first memory region, and accordingly, the first traffic may access the first memory region of the memory.

In response to the first traffic being transmitted to the memory device, a first interrupt may be transmitted to the memory device. In response to the first interrupt, the physical address of the memory mapped to the device address 0x0AB_C000 may be converted into a second physical address 0x012_4000 that designates the second memory region. Since the first interrupt only affects the conversion of the physical address of the memory mapped to the device address and does not change the data stored in the memory region, the first interrupt is discarded after the physical address conversion of the memory, and accordingly, it may be marked as Dummy in the fourth timing diagram 740. The conversion may be performed by the address translator (e.g., the address translator 120 of FIG. 3) of the memory device.

The second traffic may access the memory of the memory device based on the device address 0x0AB_C000. In this case, the device address 0x0AB_C000 is mapped to the second physical address 0x012_4000 that designates the second memory region, and accordingly, the second traffic may access the second memory region of the memory.

In response to the second traffic being transmitted to the memory device, a second interrupt may be transmitted to the memory device. In response to the second interrupt, the physical address of the memory mapped to the device address 0x0AB_C000 may be converted into a third physical address 0x012_5000 that designates the third memory region. Since the second interrupt only affects the conversion of the physical address of the memory mapped to the device address and does not change the data stored in the memory region, the second interrupt is discarded after the physical address conversion of the memory, and accordingly, it may be marked as Dummy in the fourth timing diagram 740. Such a conversion may be performed by the address translator of the memory device.

The third traffic may access the memory of the memory device based on the device address 0x0AB_C000. In this case, the device address 0x0AB_C000 is mapped to the third physical address 0x012_5000 that designates the third memory region, and accordingly, the third traffic may access the third memory region of the memory.

In response to the third traffic being transmitted to the memory device, a third interrupt may be transmitted to the memory device. However, if the physical address of the memory mapped to the device address 0x0AB_C000 is the last physical address of the memory, the physical address of the memory mapped to the device address 0x0AB_C000 may be maintained without being converted. Since the third interrupt only affects the conversion of the physical address of the memory mapped to the device address and does not change the data stored in the memory region, the third interrupt is discarded after the physical address conversion of the memory, and accordingly, it may be marked as Dummy in the fourth timing diagram 740. Such a conversion may be performed by the address translator of the memory device. Alternatively, if the physical address of the memory mapped to the device address 0x0AB_C000 is the last physical address, in response to the third interrupt, the physical address of the memory mapped to the device address 0x0AB_C000 may be mapped to one of the previously mapped physical addresses of the memory. For example, the physical address of the memory mapped to the device address 0x0AB_C000 may be mapped to the first physical address 0x012_3000, which is the first mapped physical address of the memory.

The fourth traffic may access the memory of the memory device based on the device address 0x0AB_C000. In this case, the device address 0x0AB_C000 may still be mapped to the third physical address 0x012_5000 that designates the third memory region, and accordingly, the fourth traffic may access the third memory region of the memory. Alternatively, the device address 0x0AB_C000 may be mapped to one of the previously mapped physical addresses of the memory, and the fourth traffic may access the memory region designated by the mapped physical address of the memory. For example, the device address 0x0AB_C000 may be mapped to the first physical address 0x012_3000 that designates the first memory region, and accordingly, the fourth traffic may access the first memory region of the memory.

The traffics and interrupts may be repeatedly transmitted to the memory device. However, since the physical address of the memory mapped to the device address 0x0AB_C000 is the last physical address, the physical address of the memory mapped to the device address 0x0AB_C000 may be maintained, and a traffic transmitted to the memory device after the fourth traffic may access the third memory region of the memory. Alternatively, the physical address of the memory mapped to the device address 0x0AB_C000 may be at least one of the previously mapped physical addresses of the memory, and a traffic transmitted to the memory device after the fourth traffic may access one of the first to third memory regions of the memory.

In addition to the example illustrated in FIG. 7, if the physical address of the memory mapped to the device address is converted beyond a predefined range, the physical address of the memory may not be converted or may be converted into a physical address of the memory within the predefined range.

As described above, if the physical address of the memory mapped to the device address is the last physical address, the physical address of the mapped memory may be maintained without conversion or may be converted to the physical address of the first mapped memory. As a result, the problem of a non-existent physical address being mapped to the device address may be prevented.

FIG. 8 is a diagram illustrating an example of a table 800 listing the data transmitted between memory devices. The table 800 may include first to fourth columns 810, 820, 830, and 840.

The first column 810 may represent a memory address of a transmitting-side memory device where data to be transmitted is stored. Items of the first column 810 may be determined based on a size of the data to be transmitted and/or a size of the memory region where the data to be transmitted is stored. For example, the first item in the first column 810 may be a "memory address" which is a memory address where the first data is stored, and if the size of the first data is "first data size", the second item in the first column 810 may be "memory address+the first data size", which is a memory address where the second data is stored. Likewise, if the size of the second data is "second data size", the third item of the first column 810 may be "memory address+second data size", which is a memory address where the third data is stored.

The second column 820 may indicate a device address of a receiving-side memory device. The receiving-side memory device may perform dynamic address mapping, and accordingly, all the items in the second column 820 may be identical. For example, all the items in the second column 820 may be identical as "device address".

The third column 830 may indicate the size of the data to be transmitted. Alternatively, the third column 830 may indicate the size of the memory region where the data to be transmitted is stored.

The fourth column 840 may indicate an interrupt used in the data transmission process. For example, after the first data is transmitted, the physical address of the memory of the receiving-side memory device mapped to the first device address may be converted, and the first interrupt triggering this may be transmitted from the transmitting-side memory device to the receiving-side memory device. In this case, the first item of the fourth column 840 may be "remote interrupt". In addition, after the n-th data (where, n is a natural number of 2 or more) is transmitted, the data transmission process ends, and a second interrupt may be transmitted to an internal processor included in the transmitting-side memory device to inform the end of the data transmission process. In this case, the n-th item of the fourth column 840 may be "local interrupt".

Although FIG. 8 illustrates that the table 800 includes the first to fourth columns 810, 820, 830, and 840, the present disclosure is not limited thereto, and some columns may be omitted or other columns may be added. In addition, in FIG. 8, a structure representing or characterizing a descriptor is expressed in a table, but the present disclosure is not limited thereto, and it may be expressed as any data structure that represents or characterizes the descriptor.

Figure 9:
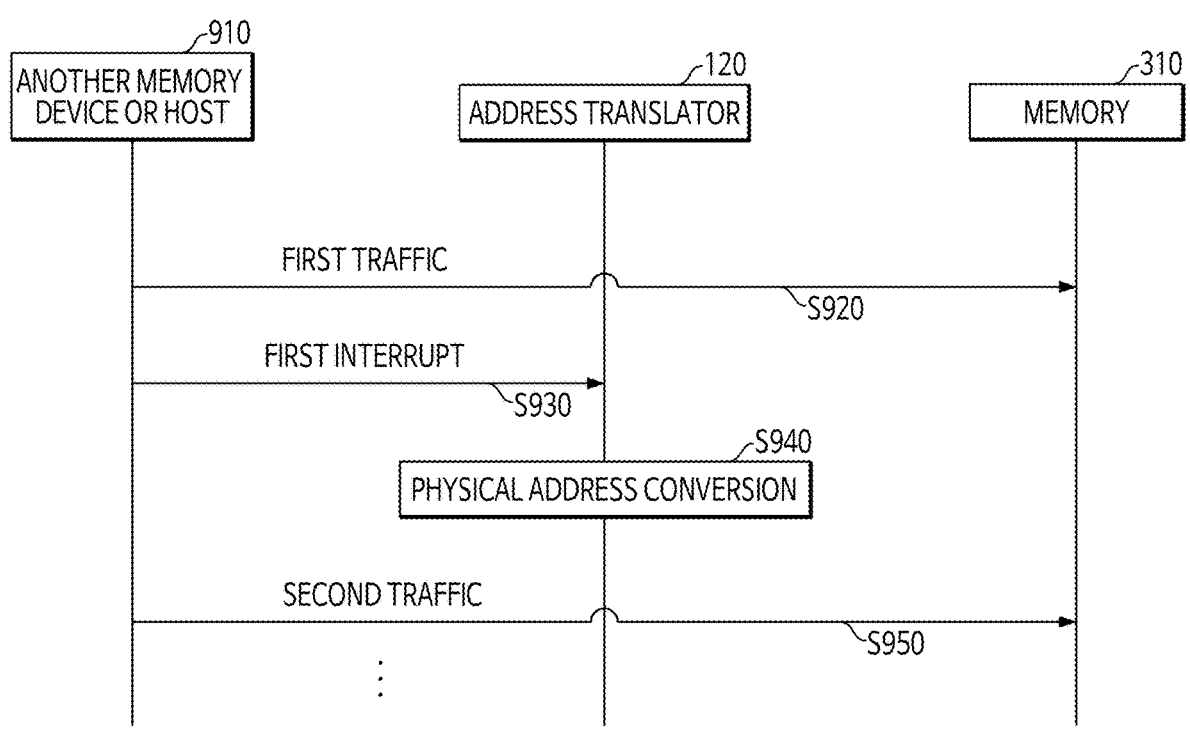
FIG. 9 is a diagram provided to explain a procedure in which the memory device receives traffics and performs dynamic address mapping according to one aspect.

FIG. 9 is a diagram provided to explain a procedure in which the memory device receives traffics and performs dynamic address mapping according to one aspect. The memory device may include the address translator 120 and the memory 130.

The memory 130 of the memory device (e.g., the memory device 100 of FIG. 1, the memory device 200 of FIG. 2, or the memory device 300 of FIG. 3) may receive a first traffic from another memory device or a host 910, at S920. In this case, the first traffic may access the first memory region of the memory 130 based on the device address, and the device address may be mapped to a first physical address that designates the first memory region.

The address translator 120 may receive a first interrupt from another memory device or the host 910, at S930. In response to the first interrupt, the address translator 120 may convert the physical address mapped to the device address, at S940. For example, in response to the first interrupt, the address translator 120 may convert the physical address mapped to the device address from the first physical address to a second physical address that designates the second memory region.

The memory 130 of the memory device may receive a second traffic from another memory device or the host 910, at S950. In this case, the second traffic may access the second memory region of the memory 130 based on the device address, and the device address may be mapped to the second physical address.

As in the configuration described above, the memory device may perform dynamic address mapping through the address translator 120 to allow the traffics received based on the same device address to access different memory regions of the memory 130. Accordingly, the size of the address register of the memory device storing the device address can be minimized and the excessive resource consumption issues and/or the security problems may be prevented.

Figure 10:
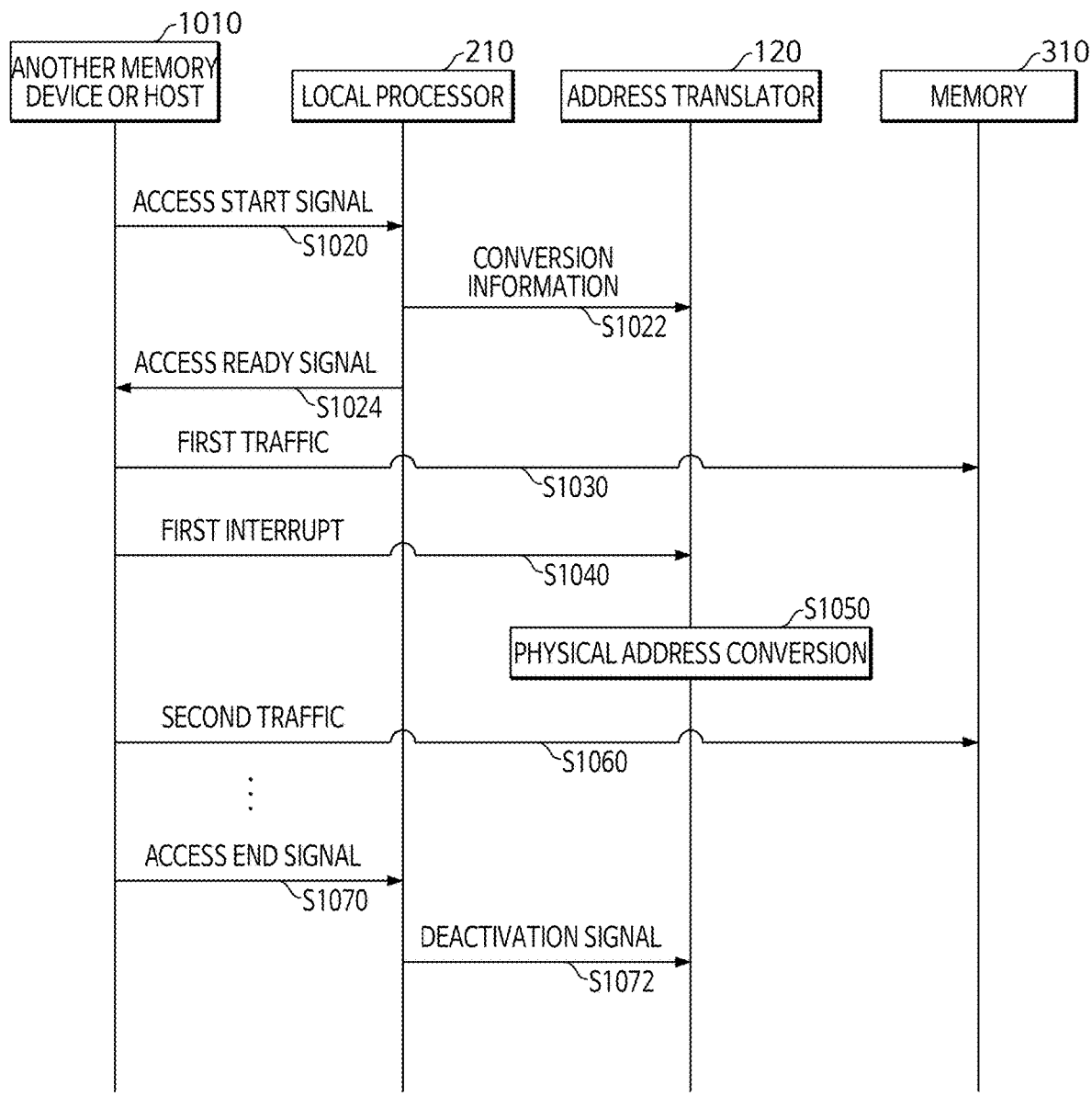
FIG. 10 is a diagram provided to explain a procedure in which the memory device receives traffics and performs dynamic address mapping according to another aspect.

FIG. 10 is a diagram provided to explain a procedure in which the memory device receives traffics and performs dynamic address mapping according to another aspect. The memory device (e.g., the memory device 200 of FIG. 2, etc.) may include the address translator 120, the memory 130, and the local processor 210.

The local processor 210 of the memory device may receive an access start signal from another memory device or a host 1010, at S1020. In response to the access start signal, the local processor 210 may transmit and set the conversion information of the address translator 120, at S1022. For example, in response to the access start signal, the local processor 210 may set the physical address of the memory 130 to be converted by the address translator 120. After setting the conversion information of the address translator 120, the local processor 210 may generate an access ready signal for the memory 130 indicating that the memory 130 is ready for access, at S1024, and transmit the generated access ready signal to another memory device or the host 1010.

The memory 130 of the memory device may receive the first traffic from another memory device or the host 1010, at S1030. In this case, the first traffic may access the first memory region of the memory 130 based on the device address, and the device address may be mapped to a first physical address that designates the first memory region.

The address translator 120 may receive a first interrupt from another memory device or the host 1010, at S1040. In response to the first interrupt, the address translator 120 may convert the physical address mapped to the device address, at S1050. For example, in response to the first interrupt, the address translator 120 may convert the physical address mapped to the device address from the first physical address to a second physical address that designates the second memory region.

The memory 130 of the memory device may receive a second traffic from another memory device or the host 1010, at S1060. In this case, the second traffic may access the second memory region of the memory 130 based on the device address, and the device address may be mapped to the second physical address.

After the traffic transmission is completed, the local processor 210 may receive an access end signal from another memory device or the host 1010, at S1070. For example, the access end signal may be transmitted in response to an interrupt that is generated after another memory device or the host 1010 transmits all the traffics.

The local processor 210 may transmit a deactivation signal to the address translator 120 in response to the access end signal, at S1072. As a result, the local processor 210 may deactivate the address translator 120.

As in the configuration described above, the memory device may include the local processor 210 that controls the address translator 120, and the memory device may set or deactivate the conversion information of the address translator 120 through the local processor 210. As a result, the memory device may control the address translator 120 to efficiently perform dynamic address mapping through the local processor 210.

Figure 11:
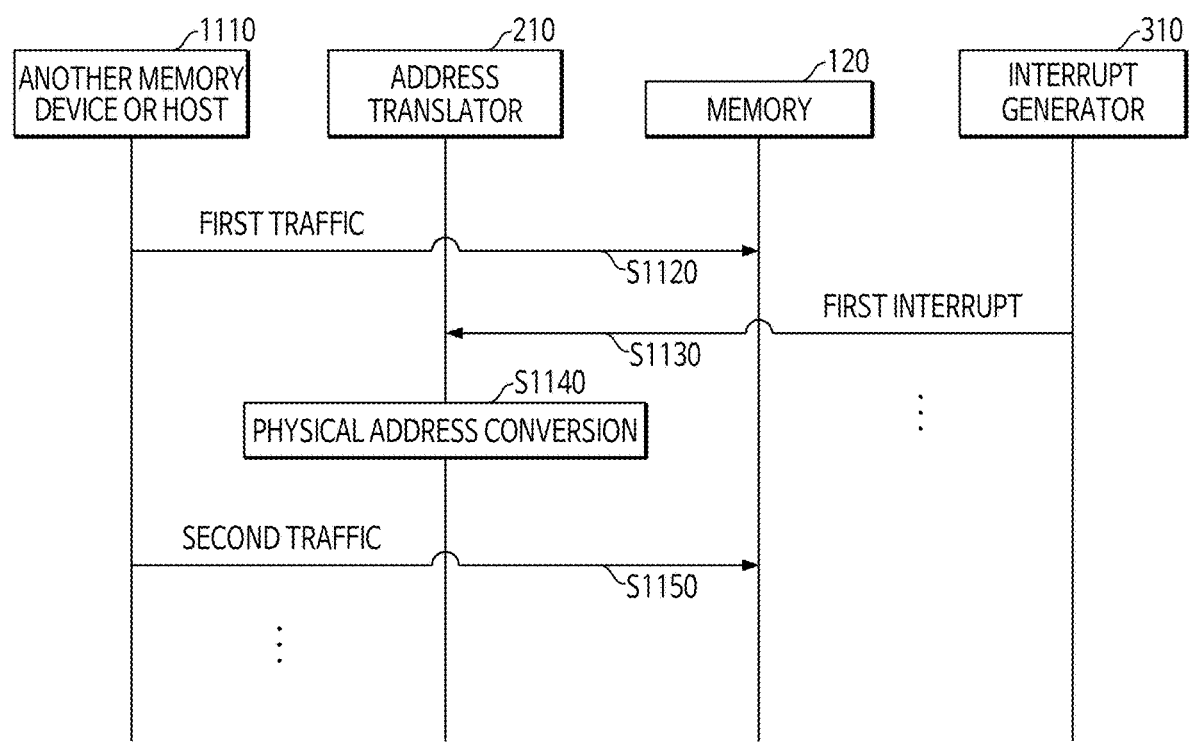
FIG. 11 is a diagram provided to explain a procedure in which the memory device receives traffic and performs dynamic address mapping according to yet another aspect.

FIG. 11 is a diagram provided to explain a procedure in which the memory device receives traffic and performs dynamic address mapping according to yet another aspect. The memory device (e.g., the memory device 300 of FIG. 3) may include the address translator 120, the memory 130, and the interrupt generator 310.

The memory 130 of the memory device may receive a first traffic from another memory device or a host 1110, at S1120. In this case, the first traffic may access the first memory region of the memory 130 based on the device address, and the device address may be mapped to a first physical address that designates the first memory region.

The address translator 120 may receive a first interrupt from the interrupt generator 310, at S1130. In response to the first interrupt, the address translator 120 may convert the physical address mapped to the device address, at S1140. For example, in response to the first interrupt, the address translator 120 may convert the physical address mapped to the device address from the first physical address to a second physical address that designates the second memory region.

The memory 130 of the memory device may receive a second traffic from another memory device or the host 1110, at S1150. In this case, the second traffic may access the second memory region of the memory 130 based on the device address, and the device address may be mapped to the second physical address.

As in the configuration described above, the memory device may include the interrupt generator 310 that generates an interrupt associated with the address conversion, and the memory device may perform dynamic address mapping based on the interrupt generated by the interrupt generator 310. As a result, latency that may occur when receiving an interrupt associated with address conversion from another memory device or the host 1110 may be prevented.

Figure 12:
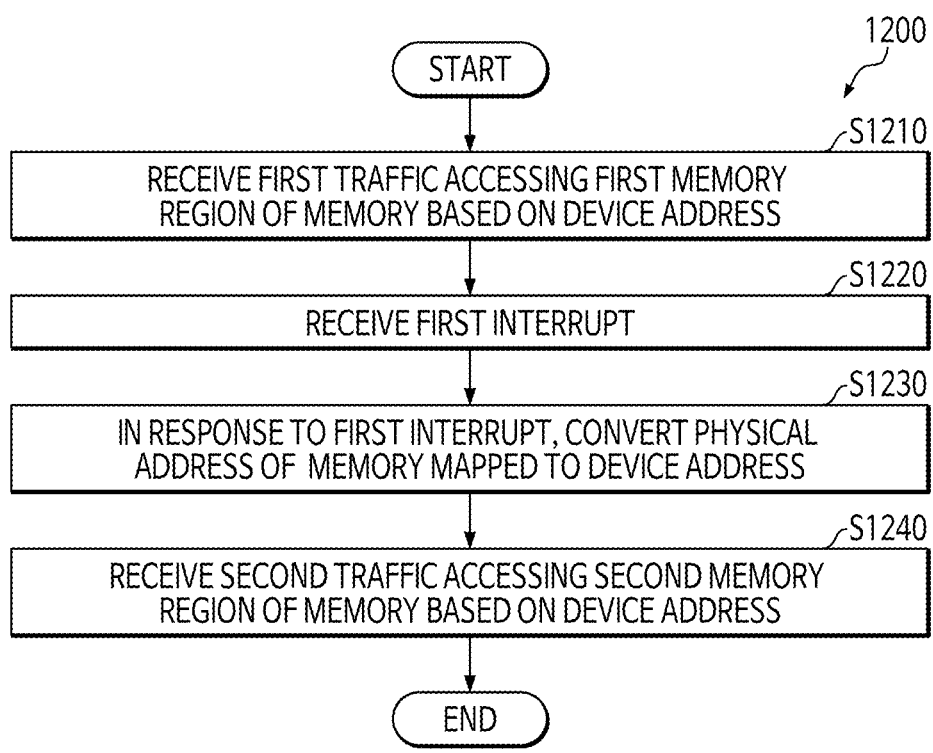
FIG. 12 is a flowchart provided to explain an example of a method for dynamically mapping address according to one aspect.

FIG. 12 is a flowchart provided to explain an example of a method 1200 for dynamically mapping address. The method 1200 may be performed by the memory device (e.g., the memory device 100 of FIG. 1, the memory device 200 of FIG. 2, the memory device 300 of FIG. 3, etc.) that includes a memory. The method 1200 may be initiated by receiving a first traffic accessing the first memory region of the memory based on the device address, at S1210.

The memory device may receive a first interrupt, at S1220. The memory device may receive the first interrupt based on an interrupt control address different from the device address. In this case, the device address and the interrupt control address may be stored in the address register of the memory device.

In response to the first interrupt, the memory device may convert the physical address of the memory mapped to the device address, at S1230. If the physical address of the memory mapped to the device address is the last physical address, the memory device may maintain the physical address of the memory mapped to the device address.

Finally, the memory device may receive a second traffic accessing the second memory region of the memory based on the device address, at S1240. The first traffic, the second traffic, and the first interrupt may be received from at least one of a memory device different from the memory device or the host.

In one aspect, the memory device may be configured to, before receiving the first traffic, receive the access start signal for the memory from at least one of the memory device different from the memory device or the host, set the conversion information of the memory device in response to the access start signal, and generate an access ready signal for the memory and transmit the generated access ready signal to at least one of the memory device different from the memory device or the host.

In one aspect, the memory device may be configured to, after receiving the second traffic, receive the access end signal for the memory from at least one of the memory device different from the memory device or the host, and in response to the access end signal, deactivate the conversion of the physical address of the memory. In this case, the access end signal may be transmitted in response to at least one second interrupt from the memory device different from the memory device or the host, and the second interrupt may be generated after at least one of the memory device different from the memory device or the host transmits all the traffics.

In another aspect, the memory device may be configured to receive the first interrupt from the interrupt controller of the memory device. In this case, the interrupt controller may be configured to generate the first interrupt in response to the memory receiving the traffic from at least one of the memory device different from the memory device or the host.

The flowchart illustrated in FIG. 12 and the above description are merely examples, and may be implemented differently in some other examples. For example, in some aspects, the order of respective operations may be changed, some of the operations may be repeatedly performed, some may be omitted, or some may be added.

The functions performed by each of the configurations described above or the methods described above may be provided as a computer program stored in a computer-readable recording medium for execution on a computer. The medium may be a type of medium that continuously stores a program executable by a computer, or temporarily stores the program for execution or download. In addition, the medium may refer to a variety of recording means or storage means that have a single piece of hardware or a combination of several pieces of hardware, and the medium is not limited to those that are directly connected to any computer system, and the medium may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, a ROM, a RAM, and a flash memory. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchange of hardware and software, various exemplary components, blocks, modules, circuits, and steps have generally been described above from their functional perspective. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or marking data storage devices, etc. The commands may be executable by at least one processor, and may cause the processor(s) to perform certain aspects of the functions described in the present disclosure.

If implemented in software, the techniques described above may be stored on a computer-readable medium as one or more commands or codes, or may be transferred via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may be present in the ASIC. The ASIC may be present in the user terminal. Alternatively, the processor and storage medium may exist as separate components in the user terminal.

Although the examples described above have been described as utilizing aspects of the currently disclosed subject matter in one or more standalone computer systems, the present disclosure is not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable apparatus.

Although the present disclosure has been described herein in connection with some aspects, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A memory device, comprising:
   a memory comprising a plurality of memory regions;
   an address register configured to store a device address that at least one of another memory device different from the memory device or a host uses to access the memory, wherein the device address maps a first physical address designating a first memory region of the memory; and an address translator configured to:
  receive a first interrupt; and
  in response to the first interrupt, convert a physical address of the memory mapped to the device address, from the first physical address to a second physical address designating a second memory region of the memory.

2. The memory device according to claim 1, wherein
the address translator is configured to receive the first interrupt from at least one of the another memory device or the host, and
the memory is configured to:
  before receiving the first interrupt, receive a first traffic accessing the first memory region of the memory based on the device address; and
  after receiving the first interrupt, receive a second traffic accessing the second memory region of the memory based on the device address.

3. The memory device according to claim 1, wherein
the address translator is configured to receive the first interrupt based on an interrupt control address stored in the address register, and
the device address and the interrupt control address are different from each other.

4. The memory device according to claim 1, wherein a range of device addresses is smaller than a range of physical addresses of the memory.

5. The memory device according to claim 1, wherein the memory device further comprises at least one local processor configured to control the address translator.

6. The memory device according to claim 5, wherein the at least one local processor is configured to:
  receive an access start signal for the memory from at least one of the another memory device or the host; and
  in response to the access start signal, set conversion information of the address translator.

7. The memory device according to claim 6, wherein
the at least one local processor is configured to, after setting the conversion information, generate an access ready signal for the memory, and transmit the generated access ready signal to at least one of the another memory device or the host, and
in response to the access ready signal, at least one of the another memory device or the host transmits a traffic.

8. The memory device according to claim 5, wherein the at least one local processor is configured to:
  receive an access end signal for the memory from at least one of the another memory device or the host; and
  deactivate the address translator in response to the access end signal.

9. The memory device according to claim 8, wherein
the access end signal is transmitted in response to at least one second interrupt from the another memory device or the host, and
the second interrupt is generated after at least one of the another memory device or the host transmits all the traffics.

10. The memory device according to claim 1, wherein the memory device comprises a peripheral component interconnect express (PCIe) device that communicates based on a PCI-express interface.

11. The memory device according to claim 1, wherein the address translator is further configured to:
  determine the physical address of the memory mapped to the device is a last physical address; and
  maintain the physical address of the memory mapped to the device address, wherein the first physical address is the second physical address.

12. The memory device according to claim 1, wherein
the memory device comprises an interrupt controller configured to generate the first interrupt and transmit the first interrupt to the address translator, and
the interrupt controller is configured to generate the first interrupt in response to the memory receiving a traffic from at least one of the another memory device or the host.

13. A method for dynamically mapping address, the method being performed by a memory device comprising a memory and comprising:
  receiving a first traffic accessing a first memory region of the memory based on a device address wherein the device address maps a first physical address designating the first memory region of the memory;
  receiving a first interrupt;
  in response to the first interrupt, converting a physical address of the memory mapped to the device address from the first physical address to a second physical address designating a second memory region of the memory; and
  receiving a second traffic accessing the second memory region of the memory based on the device address.

14. The method according to claim 13, wherein
the receiving the first interrupt comprises receiving the first interrupt based on an interrupt control address different from the device address, and
the device address and the interrupt control address are stored in an address register of the memory device.

15. The method according to claim 13, wherein the first traffic, the second traffic, and the first interrupt are received from at least one of another memory device different from the memory device or a host.

16. The method according to claim 15, further comprising, before receiving the first traffic:
  receiving an access start signal for the memory from at least one of the another memory device or the host;
  in response to the access start signal, setting conversion information of the memory device;
  generating an access ready signal for the memory; and
  transmitting the generated access ready signal to at least one of the another memory device or the host.

17. The method according to claim 15, further comprising, after receiving the second traffic:
  receiving an access end signal for the memory from at least one of the another memory device or the host; and
  in response to the access end signal, deactivating the conversion of the physical address of the memory, wherein
  the access end signal is transmitted in response to at least one second interrupt of the another memory device or the host, and
  the second interrupt is generated after at least one of the another memory device or the host transmits all the traffics.

18. The method according to claim 13, wherein the converting the physical address of the memory mapped to the device address in response to the first interrupt comprises maintaining the physical address of the memory mapped to the device address, in response to the physical address of the memory mapped to the device address being a last physical address.

19. The method according to claim 13, wherein
the receiving the first interrupt comprises receiving the first interrupt from an interrupt controller of the memory device, and
the interrupt controller is configured to generate the first interrupt in response to the memory receiving a traffic from at least one of another memory device different from the memory device or a host.

20. A non-transitory computer-readable recording medium storing instructions for executing the method according to claim 13.

* * * * *